United States Patent
Ikeda et al.

(10) Patent No.: US 6,753,795 B2
(45) Date of Patent: Jun. 22, 2004

(54) CODE GENERATION DEVICE, SEMICONDUCTOR DEVICE, AND RECEIVER DEVICE

(75) Inventors: Norihiro Ikeda, Kawasaki (JP); Shoji Taniguchi, Kawasaki (JP); Masami Kanasugi, Kawasaki (JP); Koichi Kuroiwa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/342,094

(22) Filed: Jan. 15, 2003

(65) Prior Publication Data

US 2003/0146856 A1 Aug. 7, 2003

(30) Foreign Application Priority Data

Feb. 6, 2002 (JP) ........................................ 2002-029170

(51) Int. Cl.⁷ ................................................ H03M 7/00
(52) U.S. Cl. ........................................................ 341/50
(58) Field of Search ............................. 341/50, 67, 76, 341/94, 95

(56) References Cited

U.S. PATENT DOCUMENTS 6,433,708 B1 * 8/2002 Eiderman ..................... 341/50

\* cited by examiner

*Primary Examiner*—Brian Young
(74) *Attorney, Agent, or Firm*—Arent Fox, PLLC.

(57) ABSTRACT

In a code generation device for generating a code: a binary-data generation circuit generates first binary data items indicating every (m+1)th one of n successive binary numbers, where $m \geq 1$ and $n \geq 2$. A binary-data derivation circuit derives m+1 second binary data items indicating m+1 binary numbers from each of the first binary data items, where the m+1 binary numbers include the first binary data item. A first processing circuit performs a predetermined common operation on identical portions of the m+1 second binary data items, and a second processing circuit performs individually predetermined operations on non-identical portions of the m+1 second binary data items, where states of corresponding bits in the non-identical portions of the m+1 second binary data items are not identical. A combining circuit combines the outputs of the first and second processing circuits.

9 Claims, 10 Drawing Sheets

$$\begin{bmatrix} C_{2^{(n+1)},0} \\ C_{2^{(n+1)},1} \\ \vdots \\ C_{2^{(n+1)},2k} \\ C_{2^{(n+1)},2k+1} \\ \vdots \\ C_{2^{(n+1)},2^{(n+1)}-2} \\ C_{2^{(n+1)},2^{(n+1)}-1} \end{bmatrix} = \begin{bmatrix} C_{2^n,0} & C_{2^n,0} \\ C_{2^n,0} & -C_{2^n,0} \\ \vdots & \vdots \\ C_{2^n,k} & C_{2^n,k} \\ C_{2^n,k} & -C_{2^n,k} \\ \vdots & \vdots \\ C_{2^n,2^n-1} & C_{2^n,2^n-1} \\ C_{2^n,2^n-1} & -C_{2^n,2^n-1} \end{bmatrix}$$

CODE GENERATION DEVICE, SEMICONDUCTOR DEVICE, AND RECEIVER DEVICE

CROSS-REFERENCE TO RELATED APPLICATION

This application is based upon and claims the benefit of priority from the prior Japanese Patent Application No.2002-029170, filed on Feb. 6, 2002, the entire contents of which are incorporated herein by reference.

BACKGROUND OF THE INVENTION

1) Field of the Invention

The present invention relates to a code generation device, a semiconductor device, and a receiver device. In particular, the present invention relates to a code generation device which generates a predetermined code, a semiconductor device including a code generation device which generates a predetermined code, and a receiver device which generates a predetermined code, and decodes a received signal by using the predetermined code.

2) Description of the Related Art

In the spread spectrum communication methods, spreading modulation is performed for transmission by using a different spreading code for each communication channel. On the receiver side, reverse spreading must be performed by using the same spreading code as that used on the transmitter side. Therefore, it is necessary to detect the spreading code and establish a timing of the spreading code in initial synchronization.

As a method of initial synchronization, the three-stage initial synchronization method is known. In the three-stage initial synchronization method, chip synchronization is established in the first stage, a spreading code group is identified and a frame timing is established in the second stage, and a spreading code is identified in the third stage.

In the second and third stages, a challenge which is to be solved for improving system performance is to identify one of a plurality of types of spreading codes at the earliest possible time. In the case where a matched filter is used, a received baseband signal is stored, a correlation between the received baseband signal and a sequence of a plurality of spreading codes is detected, and detection of a spreading code and establishment of the timing of the spreading code are achieved.

A construction of a circuit of a conventional initial synchronization device using a matched filter is explained with reference to FIG. 8. The initial synchronization device in FIG. 8 comprises a code generation circuit 10, a serial-to-parallel conversion circuit 11, a shift register 12, multipliers 13-1 to 13-m, and an adder 14. The initial synchronization device generates a hierarchized orthogonal code, and calculates and outputs a correlation value between the hierarchized orthogonal code and a received baseband signal.

The code generation circuit 10 comprises a channelization-code number generation circuit 10a, a scrambling-code number generation circuit 10b, a channelization-code generation circuit 10c, a scrambling-code generation circuit 10d, and a multiplier 10e. The code generation circuit 10 generates and outputs a spreading code.

The channelization-code number generation circuit 10a is a number fixedly assigned to each user.

The scrambling-code number generation circuit 10b is a number for designating a Gold code as a scrambling code.

The channelization-code generation circuit 10c generates a hierarchized orthogonal code corresponding to the channelization-code number generation circuit 10a.

The scrambling-code generation circuit 10d generates a Gold code corresponding to the scrambling-code number 10b.

The multiplier 10e calculates and outputs bitwise exclusive logical sums between the hierarchized orthogonal code output from the channelization-code generation circuit 10c and the Gold code output from the scrambling-code generation circuit 10d.

The serial-to-parallel conversion circuit 11 converts a (serial) bit signal output from the multiplier 10e, into a parallel signal, and outputs the parallel signal.

The shift register 12 receives a baseband signal, shifts the received baseband signal bit by bit, and outputs the shifted result as a parallel signal to the multipliers 13-1 to 13-m.

The multipliers 13-1 to 13-m calculate and output bitwise products of the parallel signal output from the serial-to-parallel conversion circuit 11 and the parallel signal output from the shift register 12.

The adder 14 calculates a sum of the outputs of the multipliers 13-1 to 13-m, and outputs the sum as a "correlation output."

Figure 8:
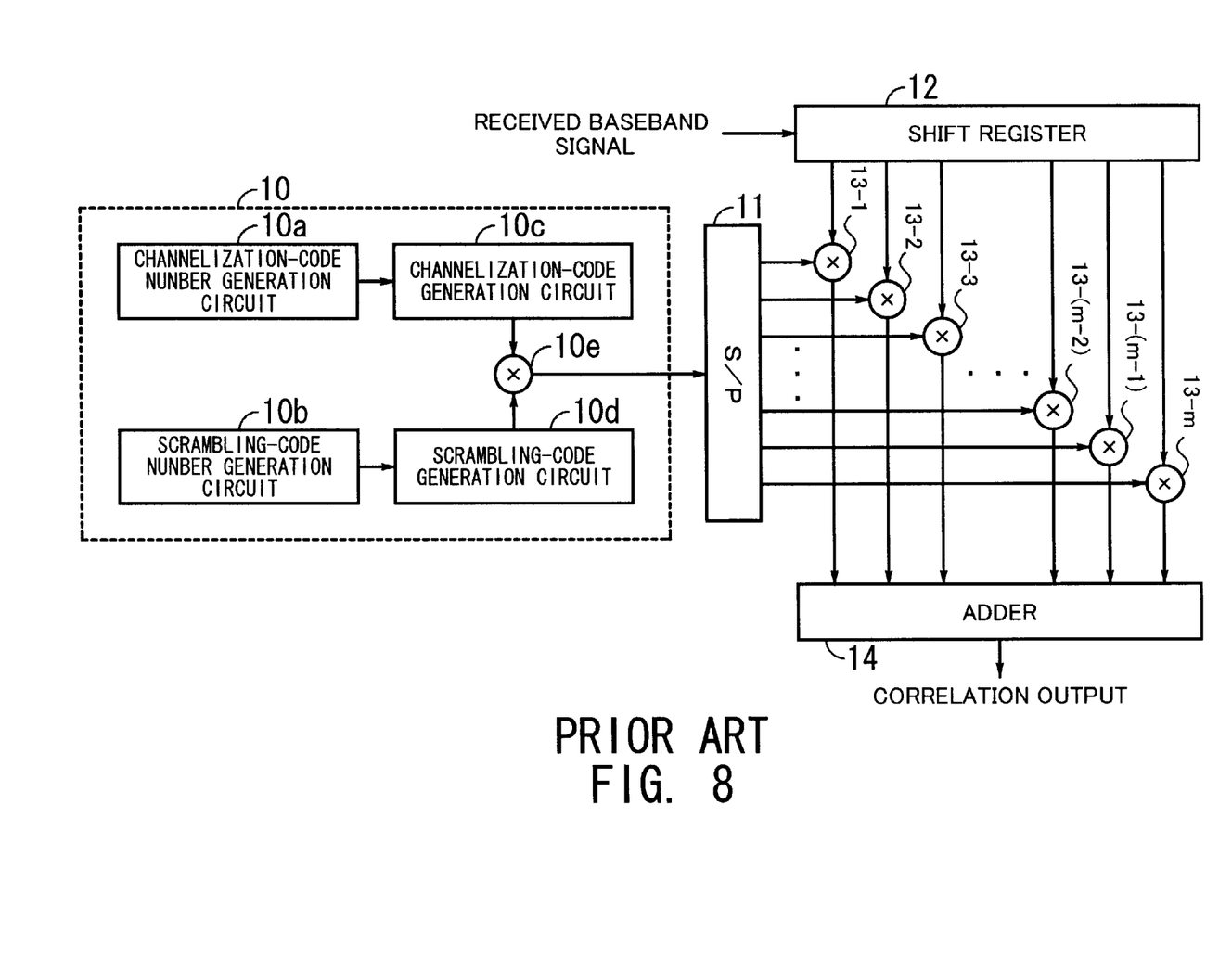
FIG. 8 is a diagram illustrating an example of a construction of a conventional initial synchronization device.
Figure 9:
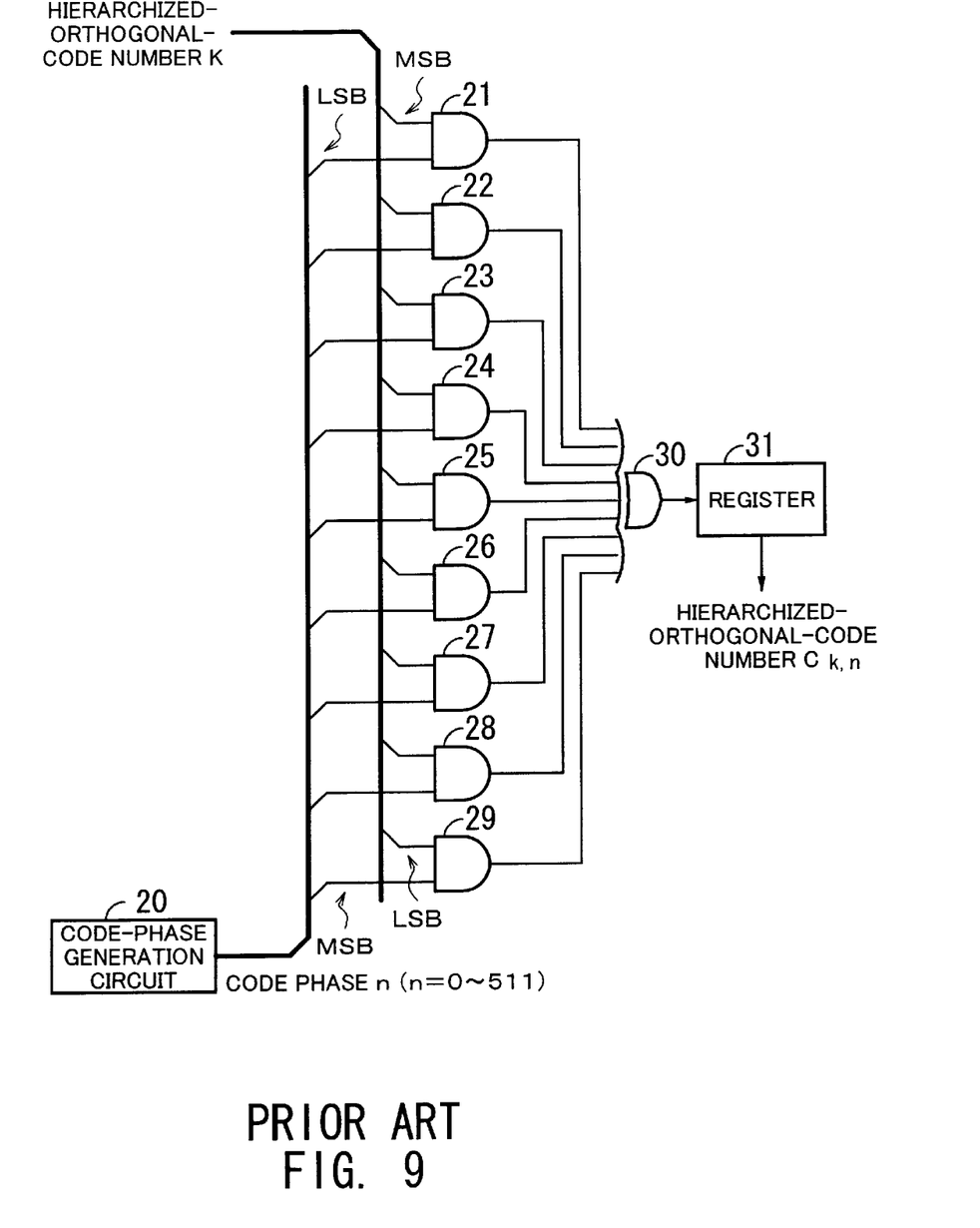
FIG. 9 is a diagram illustrating details of an example of a construction of the channelization-code generation circuit illustrated in FIG. 8.

Next, details of the construction of the channelization-code generation circuit 10c illustrated in FIG. 8 are explained with reference to FIG. 9. As illustrated in FIG. 9, the channelization-code generation circuit 10c comprises a code-phase generation circuit 20, AND gates 21 to 29, an EXCLUSIVE-OR gate 30, and a register 31.

The code-phase generation circuit 20 generates and outputs data 0 to 511 as a code phase.

The AND gates 21 to 29 calculate and output bitwise logical products of the hierarchical-orthogonal-code number k as the channelization-code number 10a and the code phase n output from the code-phase generation circuit 20.

The EXCLUSIVE-OR gate 30 calculates and outputs an exclusive logical sum of the outputs of the AND gates 21 to 29.

The register 31 stores and outputs all bits of data (as hierarchized orthogonal codes $C_{k,n}$) output from the EXCLUSIVE-OR gate 30.

Next, the operations of the above conventional example are explained. As an example, the operations for timing synchronization are explained below.

The channelization-code generation circuit 10c receives a channelization-code number 10a which is assigned to each user, and generates a channelization code corresponding to the channelization-code number 10a.

Thus, a plurality of bits constituting the hierarchical-orthogonal-code number k as the channelization-code number are respectively supplied to the AND gates 21 to 29 in the channelization-code generation circuit 10c. On the other hand, the code-phase generation circuit 20 successively generates the data 0 to 511 as the code phase, and a plurality of bits constituting the data of the code phase are respectively supplied to the AND gates 21 to 29. At this time, the plurality of bits of the code phase data supplied to the AND gates 21 to 29 are arranged in reverse order to the plurality of bits of the hierarchical-orthogonal-code number k supplied to the AND gates 21 to 29.

The AND gates 21 to 29 calculate and output bitwise logical products of the hierarchical-orthogonal-code number k as the channelization-code number generation circuit 10*a* and the code phase n output from the code-phase generation circuit 20.

The EXCLUSIVE-OR gate 30 calculates and outputs an exclusive logical sum of the outputs of the AND gates 21 to 29.

The register 31 stores bit data being output from the EXCLUSIVE-OR gate 30 and corresponding to the code phase 0 to 511, and outputs the bit data as hierarchized orthogonal codes.

On the other hand, the scrambling-code generation circuit 10*d* generates and outputs a Gold code as a scrambling code corresponding to the scrambling-code number generation circuit 10*b*. The Gold code is basically a code sequence obtained by adding two M-sequences having an identical period, and has a code length corresponding to a plurality of symbol lengths while the code length of the channelization code is the symbol length.

The multiplier 10*e* calculates and outputs a product of the data output from the channelization-code generation circuit 10*c* and the data output from the scrambling-code generation circuit 10*d*. As mentioned before, the bit length of the scrambling code is greater than the bit length of the channelization code. Therefore, the channelization-code generation circuit 10*c* repeatedly outputs identical codes, and the multiplier 10*e* calculates and outputs bitwise exclusive logical sums, a product of the scrambling code and the channelization code which is repeatedly output.

The serial-to-parallel conversion circuit 11 stores the serial data output from the multiplier 10*e*, in a register built in the serial-to-parallel conversion circuit 11, converts the serial data into parallel data, and outputs the bits of the parallel data to the multipliers 13-1 to 13-m, respectively.

The shift register 12 receives a baseband signal from the left end, and shifts the received baseband signal bit by bit to the right. At this time, the bits in the shift register 12 are output to the multipliers 13-1 to 13-m, respectively.

The multipliers 13-1 to 13-m calculate bitwise products of the baseband signal output from the shift register 12 and the spreading code output from the serial-to-parallel conversion circuit 11, and output the obtained results to the adder 14.

The adder 14 calculates a sum of the outputs of the multipliers 13-1 to 13-m, and outputs the sum as a "correlation output." The timing synchronization processing is performed under the condition that the spreading code output from the serial-to-parallel conversion circuit 11 is fixed, and received baseband signals are input in succession. Under this condition, a timing at which the correlation output is maximized is determined to be a synchronization timing.

However, in the above construction, it takes much time for the channelization-code generation circuit 10*c* to generate the hierarchized orthogonal code. The processing time can be reduced by arranging the circuit in a multiple form so that codes are generated in parallel.

Figure 10:
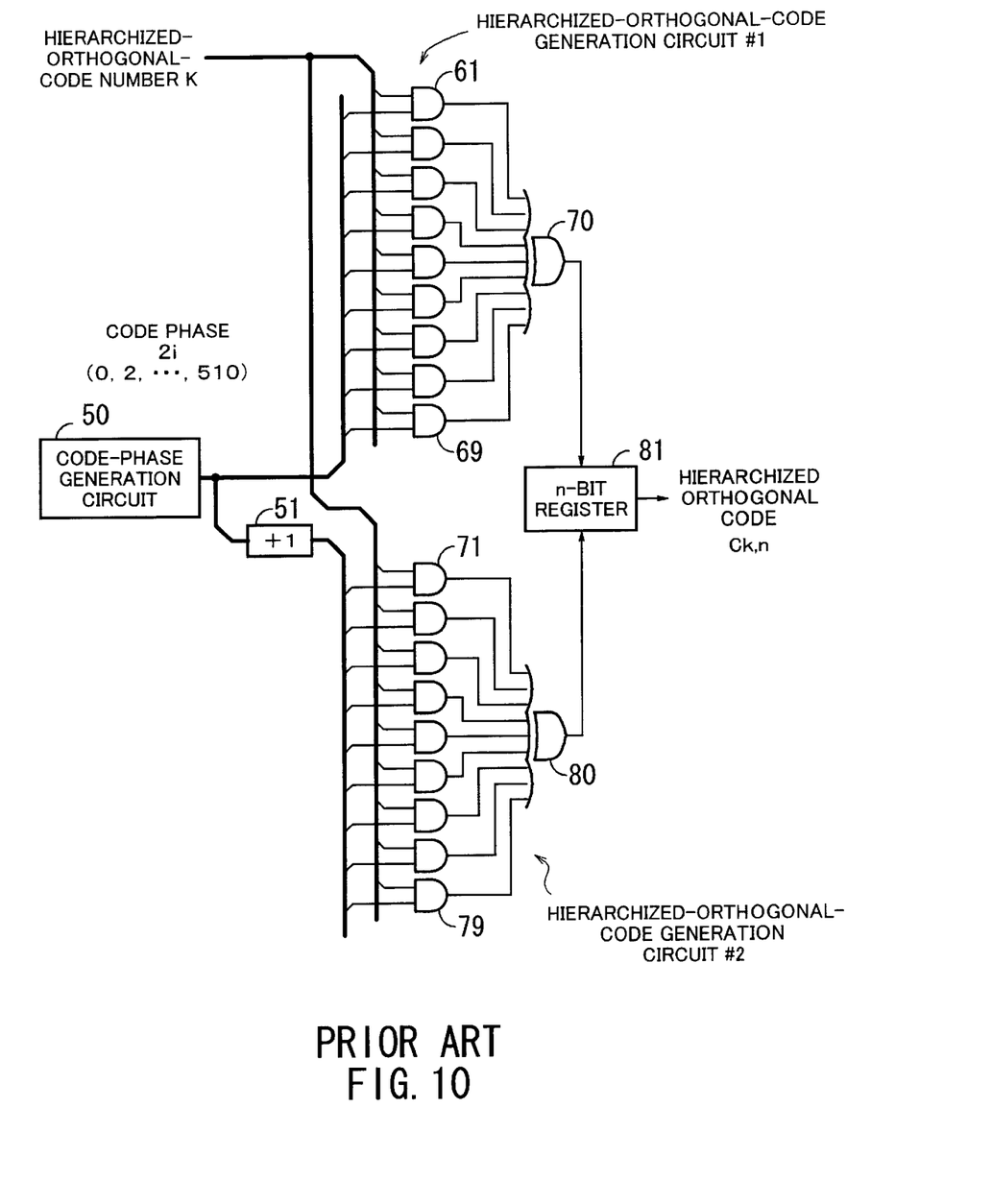
FIG. 10 is a diagram illustrating details of another example of a construction of the channelization-code generation circuit illustrated in FIG. 8.

FIG. 10 is a diagram illustrating an example of a multiple construction constituted by a plurality of hierarchical-orthogonal-code generation circuits. The example illustrated in FIG. 10 comprises a code-phase generation circuit 50, an increment circuit 51, AND gates 61 to 69, an EXCLUSIVE-OR gate 70, AND gates 71 to 79, an EXCLUSIVE-OR gate 80, and a register 81.

The code-phase generation circuit 50 generates and outputs 0, 2, . . . 510 (even numbers) as the code phase data.

The increment circuit 51 increments data output from the code-phase generation circuit 50, by one, and outputs the incremented data.

The AND gates 61 to 69 calculate and output bitwise logical products of the code phase data output from the code-phase generation circuit 50 and the hierarchical-orthogonal-code number k. At this time, the plurality of bits of the output of the code-phase generation circuit 50 supplied to the AND gates 61 to 69 are arranged in reverse order to the plurality of bits of the hierarchical-orthogonal-code number k supplied to the AND gates 61 to 69.

The AND gates 71 to 79 calculate and output bitwise logical products of the code phase data output from the increment circuit 51 and the hierarchical-orthogonal-code number k. At this time, the plurality of bits of the output of the increment circuit 51 supplied to the AND gates 71 to 79 are arranged in reverse order to the plurality of bits of the hierarchical-orthogonal-code number k supplied to the AND gates 71 to 79.

The phase data output from the code-phase generation circuit 50 are even numbers such as 0, 2, . . . 510, and the data output from the increment circuit 51 are odd numbers since the data output from the increment circuit 51 are generated by incrementing the data output from the code-phase generation circuit 50 by one. Therefore, the hierarchical-orthogonal-code generation circuit #1 generates a hierarchized orthogonal code having a code phase indicated by an even number, and the hierarchical-orthogonal-code generation circuit #2 generates a hierarchized orthogonal code having a code phase indicated by an odd number. In addition, since the hierarchical-orthogonal-code generation circuits #1 and #2 concurrently operate, the processing time required for code generation can be reduced to one-half the processing time in the construction of FIG. 9.

However, in the construction illustrated in FIG. 10, two hierarchical-orthogonal-code generation circuits #1 and #2 are necessary. Therefore, the hardware construction is complicated, and the complicated hardware increases the size of the circuit. Thus, the chip area also increases.

SUMMARY OF THE INVENTION

The present invention is made in view of the above problems, and the object of the present invention is to provide a code generation device which has a small chip size and can generate a code at high speed.

In order to accomplish the above object, a code generation device for generating a predetermined code is provided. The code generation device comprises: a binary-data generation circuit which generates every (m+1)th binary data item of successive binary numbers from 0 to n, where $m \geq 1$ and $n \geq 2$; a binary-data derivation circuit which derives m+1 binary data items indicating m+1 binary numbers from a binary number indicated by each of the binary data items which are generated by the binary-data generation circuit, where the m+1 binary numbers include the binary number indicated by the binary data item; a first processing circuit which performs a predetermined common operation on identical portions of the m+1 binary data items, where states of corresponding bits in the identical portions of the m+1 binary data items are identical; a second processing circuit which performs individually predetermined operations on non-identical portions of the m+1 binary data items, where states of corresponding bits in the non-identical portions of the m+1 binary data items are not identical; and a combining circuit which combines results of the operations by the first processing circuit and the second processing circuit.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

Figure 1:
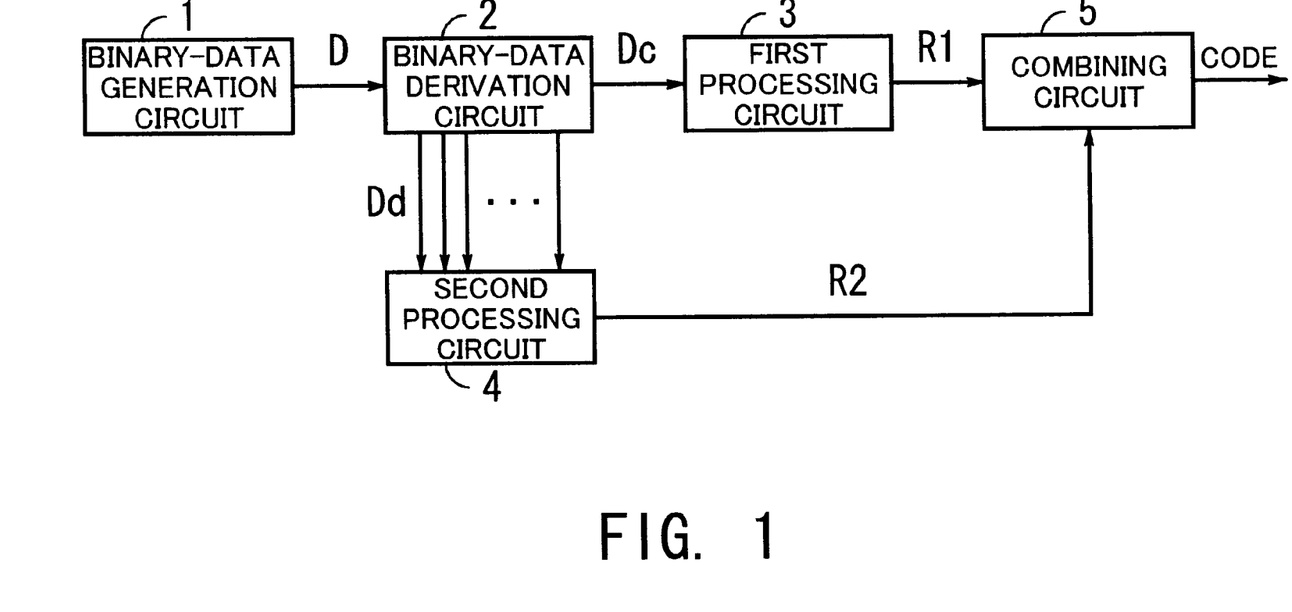
FIG. 1 is a diagram for explaining an operational principle of the present invention.

Embodiments of the present invention are explained below with reference to drawings. FIG. 1 is a diagram for explaining an operational principle of the present invention. As illustrated in FIG. 1, the code generation device according to the present invention comprises a binary-data generation circuit 1, a binary-data derivation circuit 2, a first processing circuit 3, a second processing circuit 4, and a combining circuit 5.

The binary-data generation circuit 1 generates every (m+1)th binary data item of successive binary numbers from 0 to n, where $m \geq 1$ and $n \geq 2$.

The binary-data derivation circuit 2 derives m+1 binary data items indicating m+1 binary numbers from a binary number indicated by each binary data item which is generated by the binary-data generation circuit 1, where the m+1 binary numbers include the binary number generated by the binary-data generation circuit 1.

The first processing circuit 3 performs a predetermined common operation on identical portions of the m+1 binary data items, where the states of corresponding bits in the identical portions of the m+1 binary data items are identical.

The second processing circuit 4 performs individually predetermined operations on non-identical portions of the m+1 binary data items, where the states of corresponding bits in the non-identical portions of the m+1 binary data items are not identical.

The combining circuit 5 combines the processing results of the first processing circuit 3 and the second processing circuit 4.

Next, the operations of the construction of FIG. 1 are explained.

The binary-data generation circuit 1 generates every (m+1)th binary data item of successive binary numbers from 0 to n, where $m \geq 1$ and $n \geq 2$. For example, the binary-data generation circuit 1 generates data items indicating alternate ones of successive binary numbers 0 to 510 in the case where n=511. That is, the binary data items D of 0, 2, 4, . . . 510 are generated.

The binary-data derivation circuit 2 derives m+1 binary data items indicating m+1 binary numbers from a binary number indicated by each binary data item which is generated by the binary-data generation circuit 1, where the m+1 binary numbers include the binary number generated by the binary-data generation circuit 1. For example, the binary-data derivation circuit 2 generates 0, 1, 2, 3, 4, 5, . . . 510, 511 from 0, 2, 4 . . . 510 which are generated by the binary-data generation circuit 1.

The first processing circuit 3 performs a predetermined common operation on identical portions of the m+1 binary data items, where the states of corresponding bits in the identical portions of the m+1 binary data items are identical. For example, when the binary-data derivation circuit 2 derives data items indicating 0 (=000000000) and 1 (=000000001) from a binary data item indicating 0, the identical portions $D_c$ (the eight significant bits (=00000000)) of the data items are output to the first processing circuit 3, and the first processing circuit 3 performs predetermined processing on the identical portions $D_c$, and outputs a processing result R1.

The second processing circuit 4 performs individually predetermined operations on non-identical portions of the m+1 binary data items, where the states of corresponding bits in the non-identical portions of the m+1 binary data items are not identical. For example, when data items indicating 0 (=000000000) and 1 (=000000001) are derived from the binary data item indicating 0, the non-identical portions $D_d$ (the least significant bits 0 and 1) of the data items are output to the second processing circuit 4, and the second processing circuit 4 performs individually predetermined operations on the non-identical portions $D_d$, respectively, and outputs processing results R2.

The combining circuit 5 combines the calculation result R1 output from the first processing circuit 3 and the calculation result R2 output from the second processing circuit 4, and outputs an obtained result as a desired code.

As explained above, according to the present invention, it is possible to generate m+1 codes every time the binary-data generation circuit 1 generates a binary data item. Therefore, the time necessary for code generation can be reduced.

In addition, according to the present invention, the first processing circuit 3 performs a common operation on portions of the m+1 binary data items which are identical in the states of the bits constituting the portions. Therefore, it is possible to reduce the circuit size.

Next, an embodiment of the present invention is explained.

Figure 2:
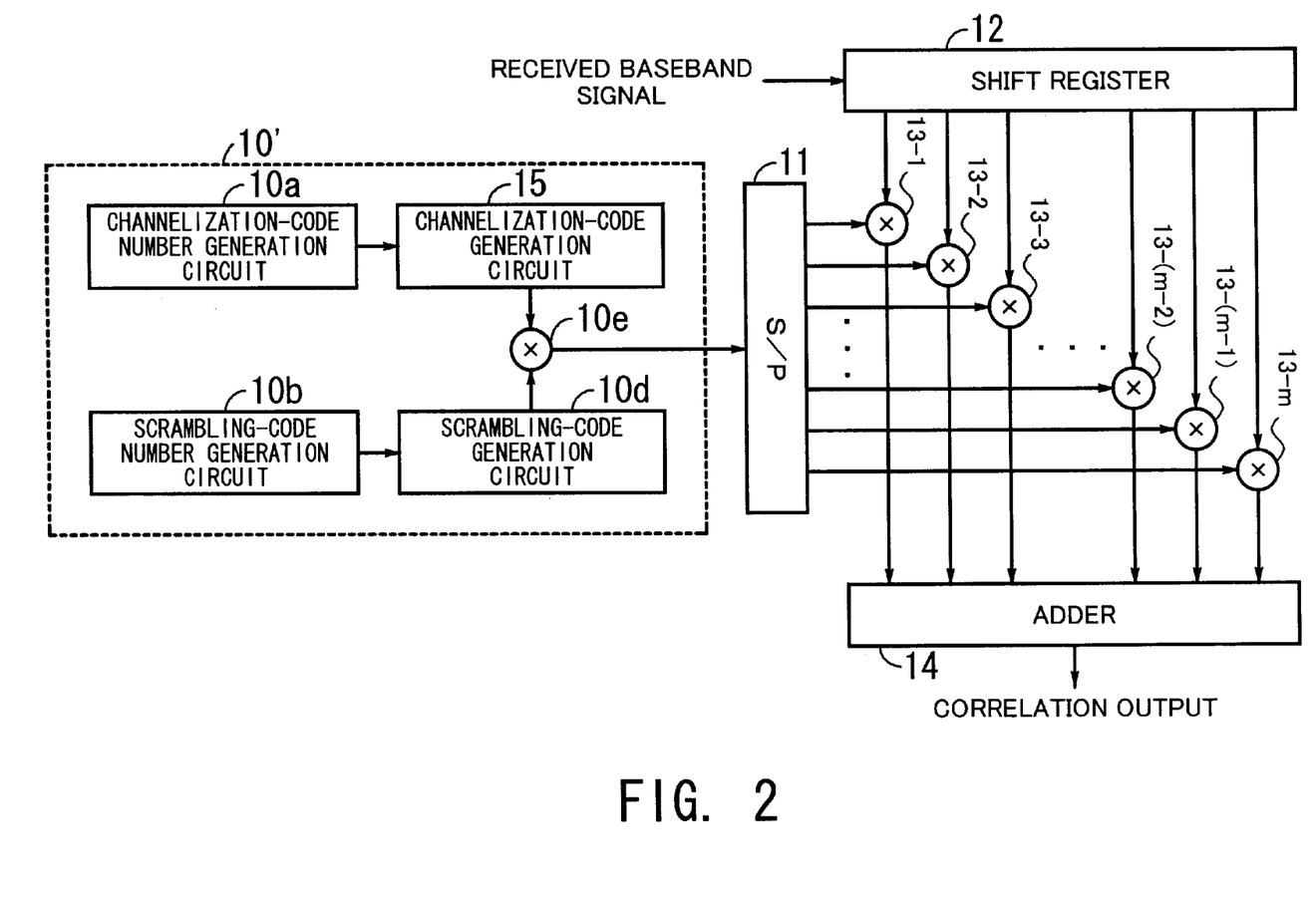
FIG. 2 is a diagram illustrating an example of a construction of an embodiment of the present invention.

FIG. 2 is a diagram illustrating an example of a construction related to the embodiment of the present invention. FIG. 2 shows an example of a construction of an initial synchronization device which includes a code generation device as the embodiment of the present invention. In FIG. 2, the same elements as FIG. 8 respectively bear the same reference numerals as FIG. 8. The construction of FIG. 2 is different from the construction of FIG. 8 in only the channelization-code generation circuit 15.

As illustrated in FIG. 2, the construction including the embodiment of the present invention comprises a code generation circuit 10', a serial-to-parallel conversion circuit 11, a shift register 12, multipliers 13-1 to 13-m, and an adder 14. The initial synchronization device of FIG. 2 generates a hierarchized orthogonal code, and calculates and outputs a correlation value between the hierarchized orthogonal code and a received baseband signal.

The code generation circuit 10' comprises a channelization-code number generation circuit 10a, a scrambling-code number generation circuit 10b, a channelization-code generation circuit 15, a scrambling-code generation circuit 10d, and a multiplier 10e. The code generation circuit 10' generates and outputs a spreading code.

The channelization-code number generation circuit 10a is a number fixedly assigned to each user.

The scrambling-code number generation circuit 10b is a number for designating a Gold code as a channelization code.

The channelization-code generation circuit 15 generates a hierarchized orthogonal code corresponding to the channelization-code number 10a by processing which is explained later.

The scrambling-code generation circuit 10d generates a Gold code corresponding to the scrambling-code number 10b.

The multiplier 10e calculates and outputs bitwise exclusive logical sums between the hierarchized orthogonal code output from the channelization-code generation circuit 15 and the Gold code output from the scrambling-code generation circuit 10d.

The serial-to-parallel conversion circuit 11 converts a (serial) bit signal output from the multiplier 10e, into a parallel signal, and outputs the parallel signal.

The shift register 12 receives a baseband signal, shifts the received baseband signal bit by bit, and outputs the shifted result as a parallel signal to the multipliers 13-1 to 13-m.

The multipliers 13-1 to 13-m calculate and output bitwise products of the parallel signal output from the serial-to-parallel conversion circuit 11 and the parallel signal output from the shift register 12.

The adder 14 calculates a sum of the outputs of the multipliers 13-1 to 13-m, and outputs the sum as a "correlation output."

Figure 3:
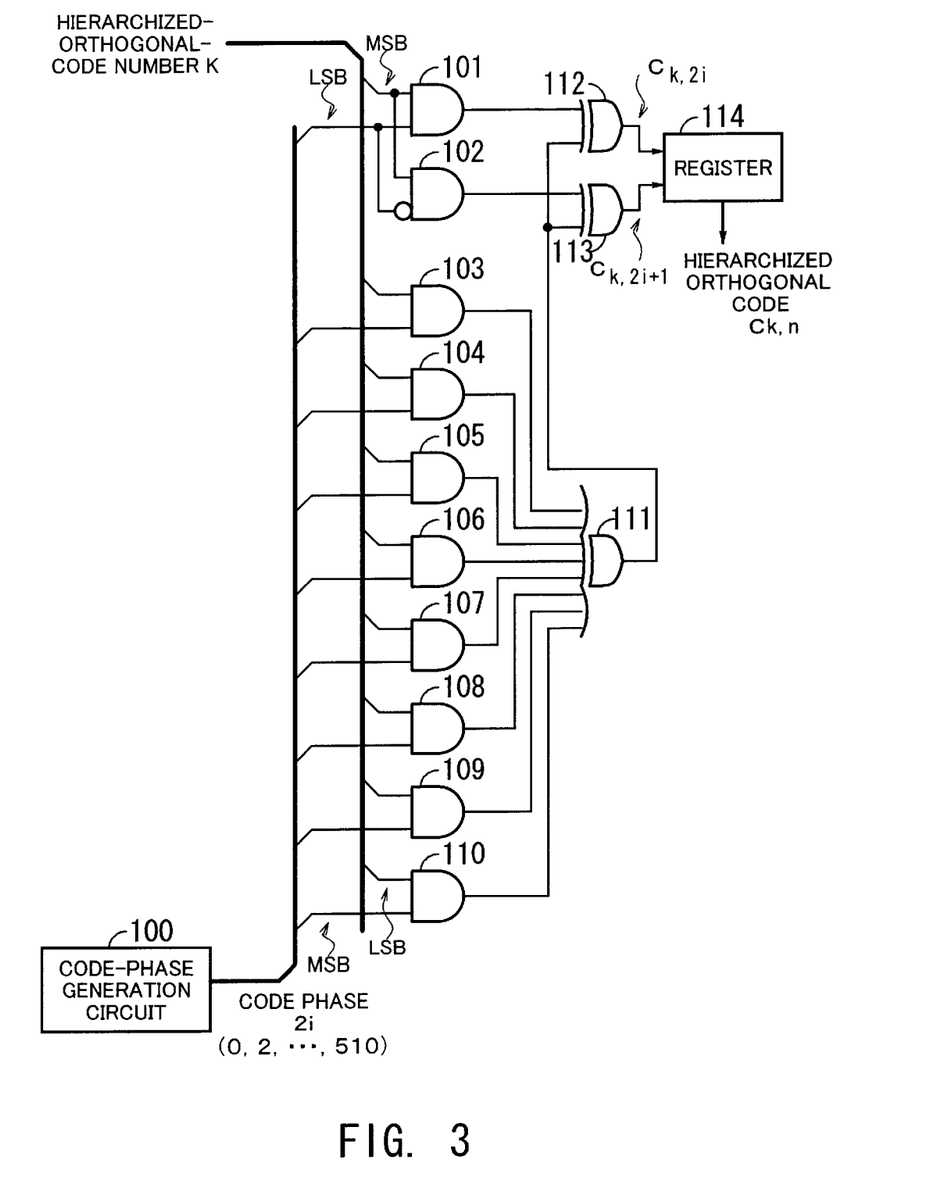
FIG. 3 is a diagram illustrating details of an example of a construction of the channelization-code generation circuit indicated in FIG. 2.

Next, details of a construction of the channelization-code generation circuit 15 in FIG. 2 are explained with reference to FIG. 3. As illustrated in FIG. 3, the channelization-code generation circuit 15 comprises a code-phase generation circuit 100, AND gates 101 to 110, EXCLUSIVE-OR gates 111 to 113, and a register 114.

The code-phase generation circuit 100 generates and outputs alternate ones of data items indicating 0 to 510 as a code phase.

The AND gate 101 calculates and outputs a logical product of the MSB of the hierarchized-orthogonal-code number k and the LSB of the code phase data output from the code-phase generation circuit 100.

The AND gate 102 calculates and outputs a logical product of the MSB of the hierarchized-orthogonal-code number k and the inversion of the LSB of the code phase data output from the code-phase generation circuit 100.

The AND gates 103 to 109 calculate and output bitwise logical products of the second to eighth most significant bits of the hierarchical-orthogonal-code number k and the eighth to second most significant bits of the code phase data.

The AND gate 110 calculates and outputs a logical product of the LSB of the hierarchized-orthogonal-code number k and the MSB of the code phase data.

The EXCLUSIVE-OR gate 111 calculates and outputs an exclusive logical sum of the outputs of the AND gates 103 to 110.

The EXCLUSIVE-OR gate 112 calculates and outputs an exclusive logical sum of the output of the AND gate 101 and the output of the EXCLUSIVE-OR circuit 111.

The EXCLUSIVE-OR gate 113 calculates and outputs an exclusive logical sum of the output of the AND gate 102 and the output of the EXCLUSIVE-OR circuit 111.

The register 114 stores (9-bit) data output from the EXCLUSIVE-OR gates 112 and 113 as the calculation results, and outputs the stored data as a hierarchized orthogonal code.

Next, the operations of the above construction of the embodiment are explained. As an example, the operations for timing synchronization are explained below.

The channelization-code generation circuit 15 receives a channelization-code number 10a which is assigned to each user, and generates a channelization code corresponding to the channelization-code number 10a. The channelization-code generation circuit 15 generates a hierarchized orthogonal code by the processing which is explained later.

Figure 4:
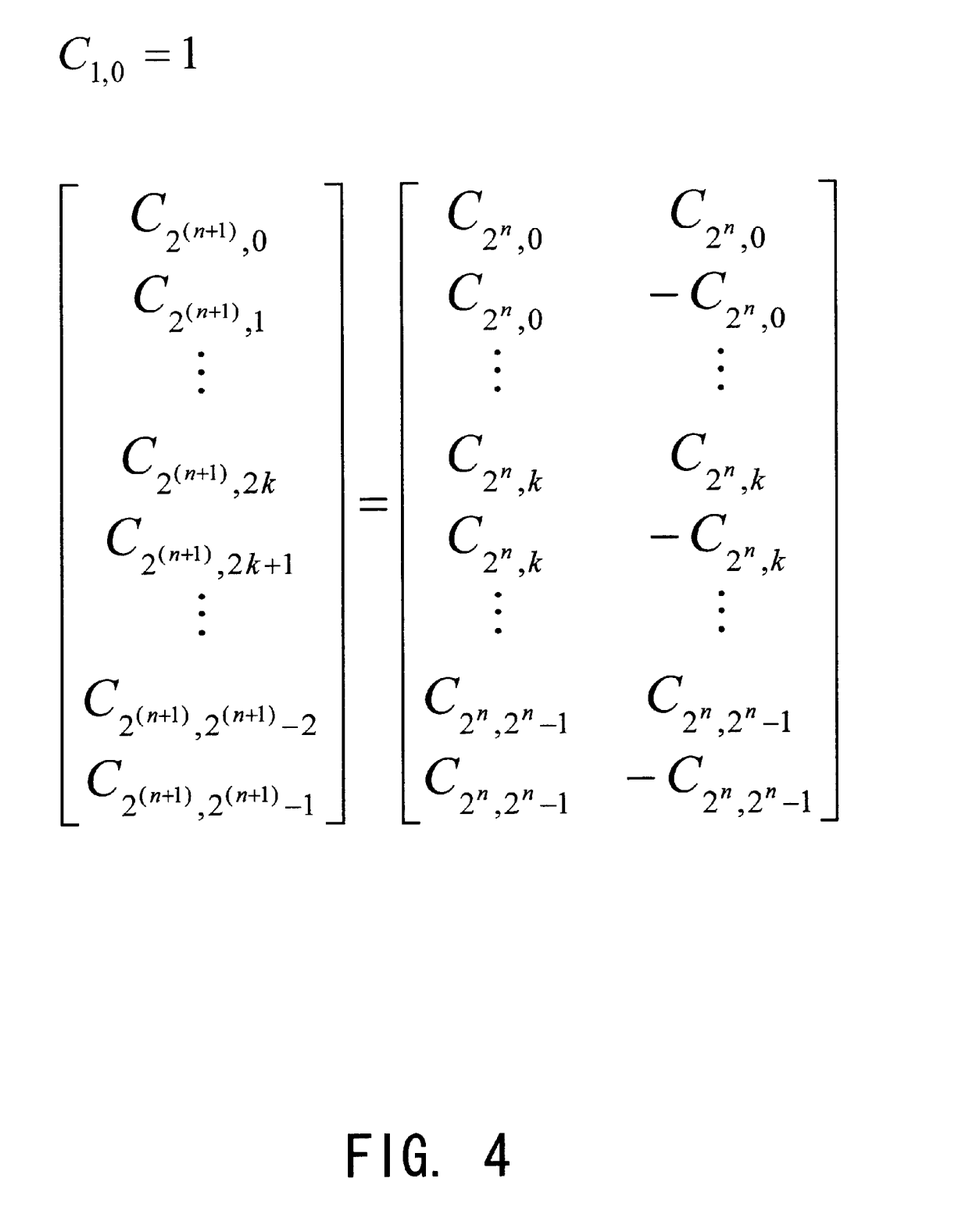
FIG. 4 is a diagram for explaining a matrix formula which defines a hierarchized orthogonal code.
Figure 5:
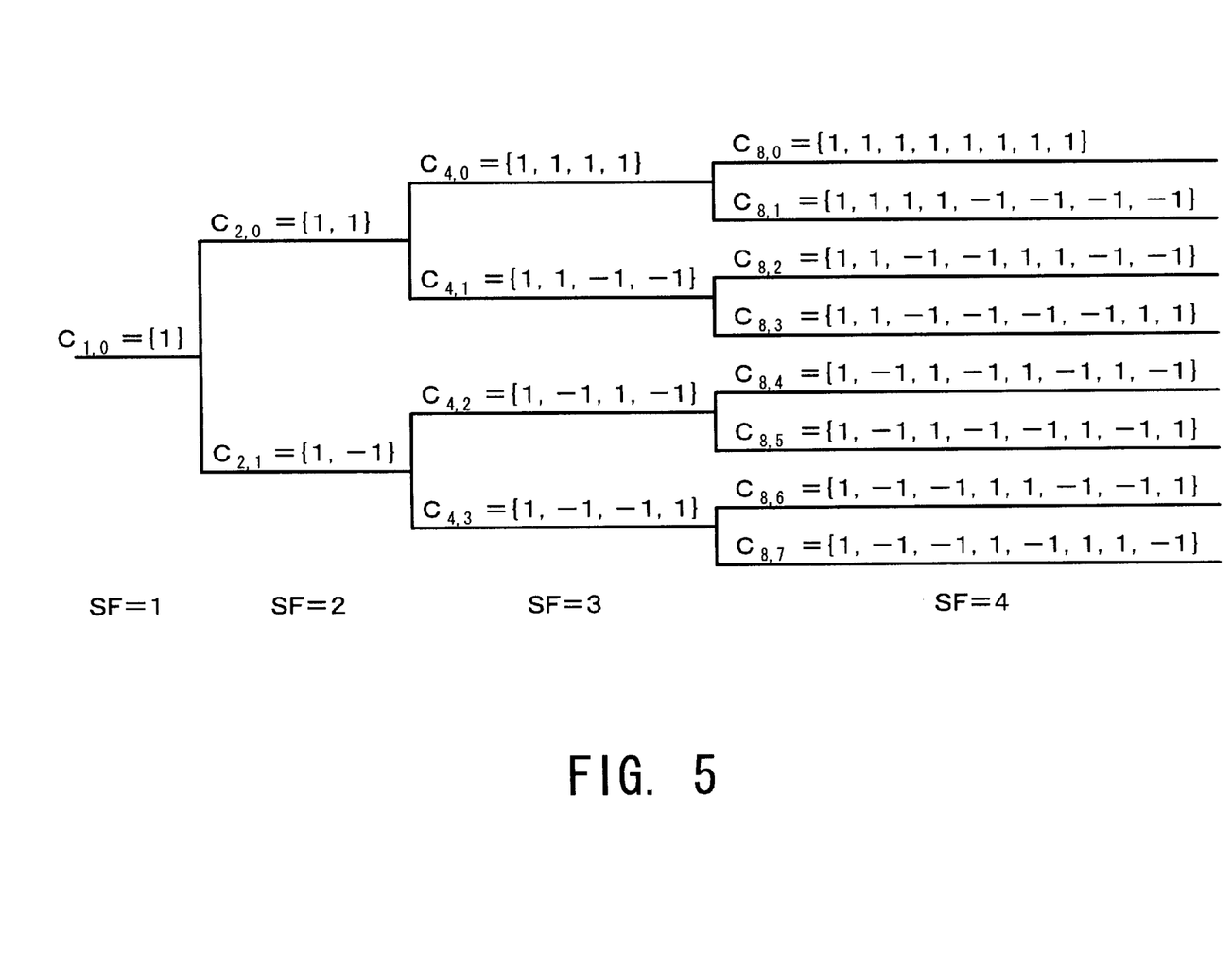
FIG. 5 is a diagram illustrating examples of hierarchized orthogonal codes generated based on the matrix formula.

At this time, the hierarchized orthogonal code is generated in accordance with the matrix formula indicated in FIG. 4, where $n \geq 0$. FIG. 5 shows a tree of spreading codes respectively generated corresponding to the values n and the hierarchized-orthogonal-code numbers based on the matrix formula indicated in FIG. 4. As illustrated in FIG. 5, when n=3, eight hierarchized orthogonal codes corresponding to the hierarchized-orthogonal-code number 0 to 7 (in decimal notation) are generated. In FIG. 4, the spreading factors (SFs) are n+1.

Figure 6:
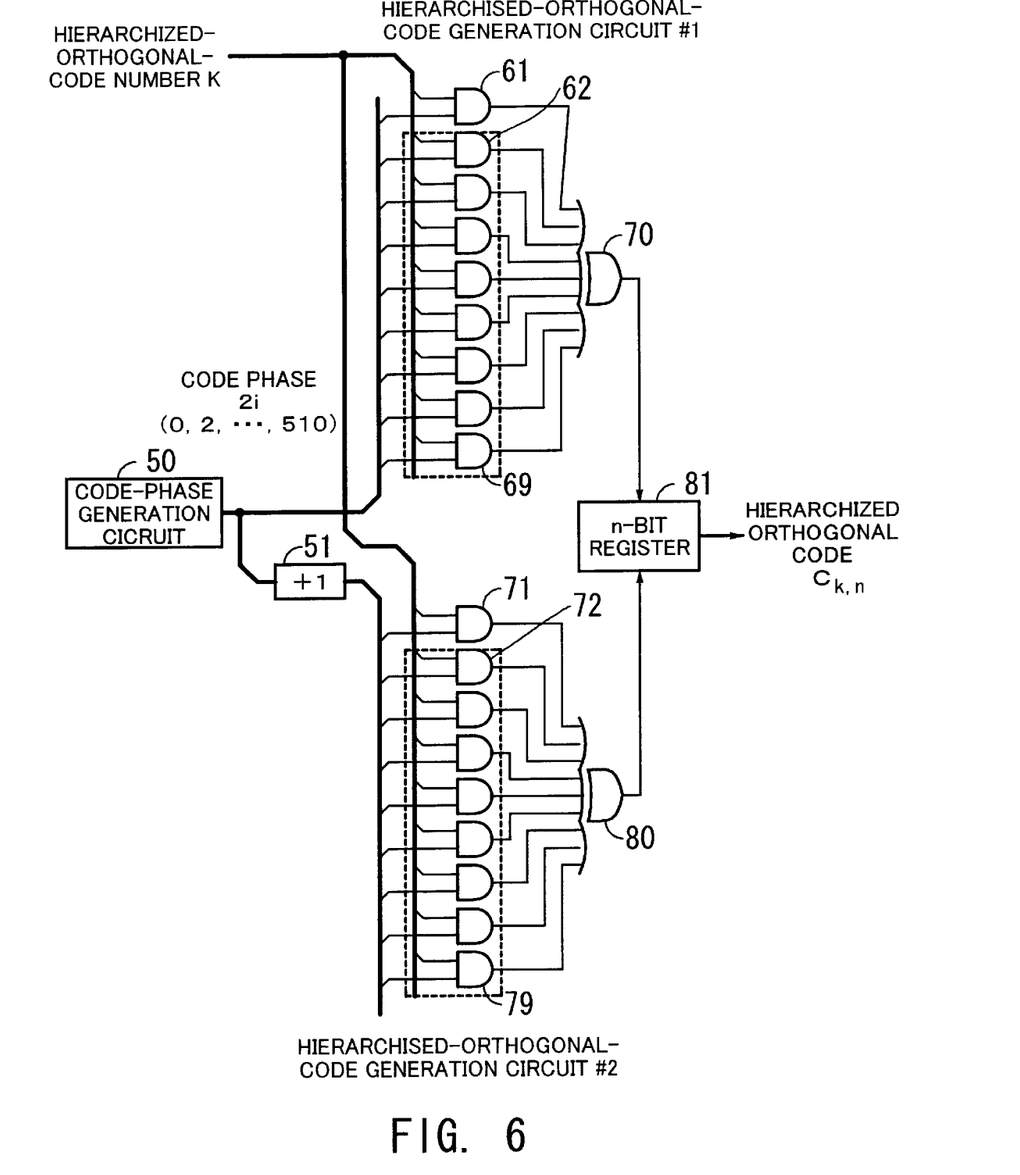
FIG. 6 is a diagram for explaining an operational principle of the channelization-code generation circuit illustrated in FIG. 3.

Conventionally, in order to generate the above hierarchized orthogonal codes at high speed, for example, the circuit is arranged in a multiple form as illustrated in FIG. 6, and data are processed in parallel. However, the arrangement in the multiple form increases the circuit size. Therefore, in the present embodiment, the portions encircled with dashed lines in FIG. 6 (i.e., the portion constituted by the AND gates 62 to 69 and the portion constituted by the AND gates 72 to 79) are replaced with a common circuit, and the other portions (the portion constituted by the AND gate 61 and the portion constituted by the AND gate 71) are individually arranged. Thus, the processing speed can be increased without increasing the circuit size.

Referring back to FIG. 3, the hierarchical-orthogonal-code number k as the channelization-code number are supplied to the AND gates 101 to 110 in the channelization-code generation circuit 15. On the other hand, the data items indicating the alternate ones of the successive numbers 0 to 510 as the code phase are generated by the code-phase generation circuit 100, and supplied to the AND gates 101 to 110. At this time, the plurality of bits of the code phase data supplied to the AND gates 101 to 110 are arranged in reverse order to the plurality of bits of the hierarchical-orthogonal-code number k supplied to the AND gates 101 to 110.

The AND gates 103 to 109 calculate and output bitwise logical products of the second to eighth most significant bits of the hierarchical-orthogonal-code number k and the eighth to second most significant bits of the code phase data. The AND gate 110 calculates and outputs a logical product of the LSB of the hierarchized-orthogonal-code number k and the MSB of the code phase data.

On the other hand, the AND gate 101 calculates and outputs a logical product of the MSB of the hierarchized-orthogonal-code number k and the LSB of the code phase data output from the code-phase generation circuit 100, and the AND gate 102 calculates and outputs a logical product of the MSB of the hierarchized-orthogonal-code number k and the inversion of the LSB of the code phase data output from the code-phase generation circuit 100.

That is, the AND gates 103 to 110 perform calculation processing on the identical portions of the alternate sequences of code phase data items, in which the states of the corresponding bits are identical, and the AND gates 101 and 102 perform calculation processing on the other portions (the LSBs) of the alternate sequences of code phase data items, in which the states of the corresponding bits are different.

The EXCLUSIVE-OR gate 111 calculates and outputs an exclusive logical sum of the outputs of the AND gates 103 to 110, i.e., an exclusive logical sum corresponding to the identical portions of the alternate sequences of code phase data.

The EXCLUSIVE-OR gate 112 calculates and outputs an exclusive logical sum of the outputs of the AND gate 101 and the EXCLUSIVE-OR circuit 111. Therefore, the EXCLUSIVE-OR gate 112 outputs codes corresponding to the even-numbered ones of the code phase numbers. On the other hand, the EXCLUSIVE-OR gate 113 calculates and outputs an exclusive logical sum of the outputs of the AND gate 102 and the EXCLUSIVE-OR circuit 111. Therefore, the EXCLUSIVE-OR gate 113 outputs codes corresponding to the odd-numbered ones of the code phase numbers.

The register 114 stores data output from the EXCLUSIVE-OR gates 112 and 113 in regions corresponding to the EXCLUSIVE-OR gates 112 and 113, respectively.

The above processing is repeated until the code-phase generation circuit 100 stops the generation of the code phase. Thus, the 8-bit hierarchized orthogonal code is generated.

On the other hand, the scrambling-code generation circuit 10d generates and outputs a Gold code as a scrambling code corresponding to the scrambling-code number 10b. The Gold code is basically a code sequence obtained by adding two M-sequences having an identical period, and has a code length corresponding to a plurality of symbol lengths while the code length of the channelization code is the symbol length.

The multiplier 10e calculates and outputs a product of the data output from the channelization-code generation circuit 15 and the data output from the scrambling-code generation circuit 10d. As mentioned before, the bit length of the scrambling code is greater than the bit length of the channelization code.

Therefore, the channelization-code generation circuit 15 repeatedly outputs identical codes, and the multiplier 10e calculates a product of the scrambling code and the channelization code which is repeatedly output.

The serial-to-parallel conversion circuit 11 stores the serial data output from the multiplier 10e, in a register built in the serial-to-parallel conversion circuit 11, converts the serial data into parallel data, and outputs the bits of the parallel data to the multipliers 13-1 to 13-m, respectively.

The shift register 12 receives a baseband signal from the left end, and shifts the received baseband signal bit by bit to the right. At this time, the bits in the shift register 12 are output to the multipliers 13-1 to 13-m, respectively.

The multipliers 13-1 to 13-m calculate bitwise products of the baseband signal output from the shift register 12 and the spreading code output from the serial-to-parallel conversion circuit 11, and output the obtained results to the adder 14.

The adder 14 calculates a sum of the outputs of the multipliers 13-1 to 13-m, and outputs the sum as a "correlation output." The timing synchronization processing is performed under the condition that the spreading code output from the serial-to-parallel conversion circuit 11 is fixed, and received baseband signals are input in succession. Under this condition, a timing at which the correlation output is maximized is determined to be a synchronization timing.

In the embodiment described as above, it is possible to generate hierarchized orthogonal codes at high speed without increasing the circuit size.

In addition, power consumption in the circuit in the above embodiment can be reduced, compared with the conventional example illustrated in FIG. 10.

Next, a CDMA receiver device (or CDMA communication device) which uses the initial synchronization device according to the present invention is explained with reference to FIG. 7.

Figure 7:
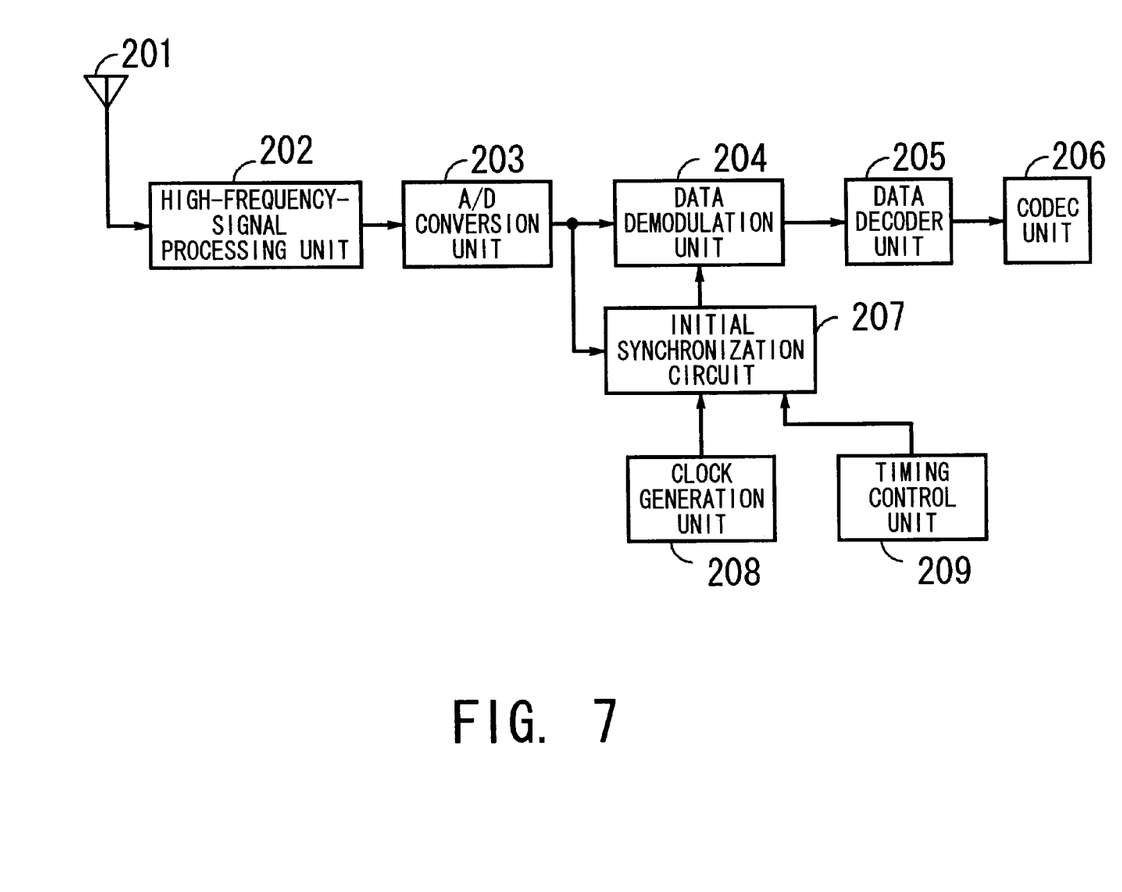
FIG. 7 is a diagram illustrating an example of a construction of a CDMA receiver device using the initial synchronization device according to the present invention.

As illustrated in FIG. 7, the CDMA receiver of FIG. 7 comprises a receiver antenna 201, a high-frequency-signal processing unit 202, an A/D (analog-to-digital) conversion unit 203, a data demodulation unit 204, a data decoder unit 205, a CODEC unit 206, an initial synchronization circuit 207, a clock generation unit 208, and a timing control unit 209.

The receiver antenna 201 captures electromagnetic waves transmitted from a base station.

The high-frequency-signal processing unit 202 performs filtering and amplification of the above electromagnetic waves at a predetermined frequency.

The A/D conversion unit 203 converts an analog signal output from the high-frequency-signal processing unit 202, into a digital signal.

The data demodulation unit 204 demodulates the demodulated digital signal output from the A/D conversion unit 203. The data decoder unit 205 corrects and decodes the signal demodulated by the reverse spreading.

The CODEC unit 206 converts the signal demodulated by the data decoder unit 205, into sound.

The initial synchronization circuit 207 acquires synchronization before communication with a base station is started.

The clock generation unit 208 generates a clock signal, and supplies the clock signal to the initial synchronization circuit 207.

The timing control unit 209 controls the initial synchronization circuit 207.

Next, the operations of the above embodiment are explained.

The A/D conversion unit 203 supplies a received baseband signal to the initial synchronization circuit 207, where the received baseband signal is a spread-modulated digital signal. On the other hand, a clock signal output from the clock generation unit 208 is applied to the initial synchronization circuit 207. The timing control unit 209 controls timings of reverse spreading and the like. The initial synchronization circuit 207 performs calculation for reverse spreading of the received baseband signal supplied from the A/D conversion unit 203, and supplies a result of the reverse spreading calculation to the data demodulation unit 204 as a result of the acquisition of synchronization. The data demodulation unit 204 demodulates data based on the result of the reverse spreading calculation, which is supplied from the initial synchronization circuit 207, and supplies the demodulated data to the data decoder unit 205.

The initial synchronization circuit 207 has the same construction as the circuit illustrated in FIG. 2, and can continuously and cyclically generate spreading code sequences in parallel. Therefore, initial synchronization can be quickly acquired. That is, the CDMA receiver using the initial synchronization device according to the present invention can quickly acquire initial synchronization.

In addition, it is possible to provide one of initial synchronization devices explained in the aforementioned embodiment, in a wireless receiver in base station equipment or a mobile device which performs mobile wireless communication in accordance with the CDMA method, as well as in other communication terminals. In these cases, the present invention is also effective for quick acquisition of initial synchronization.

Further, it is possible to realize in a semiconductor device the channelization-code generation circuit 15 illustrated in FIG. 3 or the CDMA receiver illustrated in FIG. 8.

The above embodiment indicated by the block diagrams are a merely example, and the present invention is not limited to the above embodiment.

As explained above, according to the present invention, a code generation device for generating a predetermined code is provided. The code generation device comprises: a binary-data generation circuit which generates every (m+1)th binary data item of successive binary numbers from 0 to n, where $m \geq 1$ and $n \geq 2$; a binary-data derivation circuit which derives m+1 binary data items indicating m+1 binary numbers from a binary number indicated by each of the binary data items which are generated by the binary-data generation circuit, where the m+1 binary numbers include the binary number indicated by the binary data item; a first processing circuit which performs a predetermined common operation on identical portions of the m+1 binary data items, where states of corresponding bits in the identical portions of the m+1 binary data items are identical; a second processing circuit which performs individually predetermined operations on non-identical portions of the m+1 binary data items, where states of corresponding bits in the non-identical portions of the m+1 binary data items are not identical; and a combining circuit which combines results of the operations by the first processing circuit and the second processing circuit. Therefore, the circuit size can be reduced compared with the case where processing circuits are individually provided. In addition, since more than one calculation process is performed in parallel, the code can be generated at high speed.

In addition, according to the present invention, a semiconductor device containing a code generation device for generating a predetermined code is provided. The semiconductor device comprises: a binary-data generation circuit which generates every (m+1)th binary data item of successive binary numbers from 0 to n, where $m \geq 1$ and $n \geq 2$; a binary-data derivation circuit which derives m+1 binary data items indicating m+1 binary numbers from a binary number indicated by each of the binary data items which are generated by the binary-data generation circuit, where the m+1 binary numbers include the binary number indicated by the binary data item; a first processing circuit which performs a predetermined common operation on identical portions of the m+1 binary data items, where states of corresponding bits in the identical portions of the m+1 binary data items are identical; a second processing circuit which performs individually predetermined operations on non-identical portions of the m+1 binary data items, where states of corresponding bits in the non-identical portions of the m+1 binary data items are not identical; and a combining circuit which combines results of the operations by the first processing circuit and the second processing circuit. Therefore, the code can be generated at high speed without increasing the circuit size in the semiconductor device. In addition, power consumption can be reduced.

Further, according to the present invention, a receiver device for generating a predetermined code and demodulating a received signal by using the predetermined code is provided. The receiver device comprises: a binary-data generation circuit which generates every (m+1)th binary data item of successive binary numbers from 0 to n, where $m \geq 1$ and $n \geq 2$; a binary-data derivation circuit which derives m+1 binary data items indicating m+1 binary numbers from a binary number indicated by each of the binary data items which are generated by the binary-data generation circuit, where the m+1 binary numbers include the binary number indicated by the binary data item; a first processing circuit which performs a predetermined common operation on identical portions of the m+1 binary data items, where states of corresponding bits in the identical portions of the m+1 binary data items are identical; a second processing circuit which performs individually predetermined operations on non-identical portions of the m+1 binary data items, where states of corresponding bits in the non-identical portions of the m+1 binary data items are not identical; and a combining circuit which combines results of the operations by the first processing circuit and the second processing circuit. Therefore, the operation for initial synchronization at the time of signal reception can be performed in a short time without increasing the circuit size of the receiver device.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A code generation device for generating a predetermined code, comprising:

a binary-data generation circuit which generates every (m+1)th binary data item of successive binary numbers from 0 to n, where $m \geq 1$ and $n \geq 2$;

a binary-data derivation circuit which derives m+1 binary data items indicating m+1 binary numbers from a binary number indicated by each of said binary data items which are generated by the binary-data generation circuit, where the m+1 binary numbers include the binary number indicated by said each of said binary data items;

a first processing circuit which performs a predetermined common operation on identical portions of the m+1 binary data items, where states of corresponding bits in the identical portions of the m+1 binary data items are identical;

a second processing circuit which performs individually predetermined operations on non-identical portions of the m+1 binary data items, where states of corresponding bits in the non-identical portions of the m+1 binary data items are not identical; and a combining circuit which combines results of the operations by said first processing circuit and said second processing circuit.

2. The code generation device according to claim 1, wherein said binary-data derivation circuit derives the m+1 binary data items by performing an operation on a predetermined bit or group of bits constituting each of said binary data items generated by the binary-data generation circuit.

3. The code generation device according to claim 2, wherein said first processing circuit performs said first predetermined operation on said each of said binary data items except for said predetermined bit or group of bits, and said second processing circuit individually performs one of said second predetermined operations on said predetermined bit or group of bits of said each of said binary data items.

4. The code generation device according to claim 1, wherein said predetermined code is a hierarchized orthogonal code, said first processing circuit calculates at least one first bitwise logical product of a first portion of each of said binary data items generated by the binary-data generation circuit and a portion of a hierarchized-orthogonal-code number corresponding to the first portion of said each of said binary data items, and calculates and outputs a first exclusive logical sum of said at least one first bitwise logical product, where said binary-data derivation circuit does not perform an operation on a bit or group of bits constituting said first portion of said each of said binary data items, said second processing circuit calculates at least one second bitwise logical product of a second portion of said each of said binary data items generated by the binary-data generation circuit and a portion of said hierarchized-orthogonal-code number corresponding to the second portion of said each of said binary data items, and calculates and outputs a second exclusive logical sum of said at least one second bitwise logical product, where said binary-data derivation circuit performs an operation on a bit or group of bits constituting said second portion of said each of said binary data items, and said combining circuit outputs an exclusive logical sum of said first and second exclusive logical sums.

5. A semiconductor device containing a code generation device for generating a predetermined code, comprising:

a binary-data generation circuit which generates every (m+1)th binary data item of successive binary numbers from 0 to n, where $m \geq 1$ and $n \geq 2$;

a binary-data derivation circuit which derives m+1 binary data items indicating m+1 binary numbers from a binary number indicated by each of said binary data items which are generated by the binary-data generation circuit, where the m+1 binary numbers include the binary number indicated by said each of said binary data items;

a first processing circuit which performs a predetermined common operation on identical portions of the m+1 binary data items, where states of corresponding bits in the identical portions of the m+1 binary data items are identical;

a second processing circuit which performs individually predetermined operations on non-identical portions of the m+1 binary data items, where states of corresponding bits in the non-identical portions of the m+1 binary data items are not identical; and a combining circuit which combines results of the operations by said first processing circuit and said second processing circuit.

6. A receiver device for generating a predetermined code, and demodulating a received signal by using the predetermined code, comprising:

a binary-data generation circuit which generates every (m+1)th binary data item of successive binary numbers from 0 to n, where $m \geq 1$ and $n \geq 2$;

a binary-data derivation circuit which derives m+1 binary data items indicating m+1 binary numbers from a binary number indicated by each of said binary data items which are generated by the binary-data generation circuit, where the m+1 binary numbers include the binary number indicated by said each of said binary data items;

a first processing circuit which performs a predetermined common operation on identical portions of the m+1 binary data items, where states of corresponding bits in the identical portions of the m+1 binary data items are identical;

a second processing circuit which performs individually predetermined operations on non-identical portions of the m+1 binary data items, where states of corresponding bits in the non-identical portions of the m+1 binary data items are not identical; and a combining circuit which combines results of the operations by said first processing circuit and said second processing circuit.

7. A code generation method for generating a predetermined code, the method comprising the steps of:

(a) generating a binary-data which generates every (m+1)th binary data item of successive binary numbers from 0 to n, where $m \geq 1$ and $n \geq 2$;

(b) deriving a binary-data which derives m+1 binary data items indicating m+1 binary numbers from a binary number indicated by each of said binary data items which are generated by said generating step (a), where the m+1 binary numbers include the binary number indicated by said each of said binary data items;

(c) processing a first operation which performs a predetermined operation on identical portions of the m+1 binary data items, where states of corresponding bits in the identical portions of the m+1 binary data items are identical;

(d) processing a second operation which performs predetermined operations on non-identical portions of the m+1 binary data items, where states of corresponding bits in the non-identical portions of the m+1 binary, data items are not identical; and (e) combining results of the operations by said processing steps (c) and (d).

8. The code generation method according to claim 7, wherein said processing step (c) performs said first predetermined operation on said each of said binary data items except for said predetermined bit or group of bits, and said processing step (d) performs one of said second predetermined operations on said predetermined bit or group of bits of said each of said binary data items.

9. The code generation method according to claim 8, wherein said predetermined code is a hierarchized orthogonal code, said processing step (c) calculates at least one first bitwise logical product of a first portion of each of said binary data items generated by said generating step (a) and a portion of a first hierarchized-orthogonal-code number corresponding to the first portion of said each of said binary data items, and calculates and outputs a first exclusive logical sum of said at least one first bitwise logical product, where said deriving step (b) does not perform an operation of a bit or group of bits constituting said first portion of said each of said binary data items, said processing step (d) calculates at least one second bitwise logical product of a second portion of said each of said binary data items generated by said generating step (a) and a portion of said hierarchized-orthogonal-code number corresponding to the second portion of said each of said binary data items, and calculates and outputs a second exclusive logical sum of said at one second bitwise logical product, where said deriving step (b) performs an operation on a bit or group of bits constituting said second portion of said each of said binary data items, and said combining step (e) outputs an exclusive logical sum of said first and second exclusive logical sums.

\* \* \* \* \*